United States Patent [19]

Finkelstein et al.

[11] Patent Number: 4,580,194

[45] Date of Patent: Apr. 1, 1986

[54] ALUMINUM ELECTROLYTIC CAPACITOR

[75] Inventors: Manuel Finkelstein, North Adams; Sidney D. Ross, Williamstown, both of Mass.

[73] Assignee: Sprague Electric Company, North Adams, Mass.

[21] Appl. No.: 662,756

[22] Filed: Oct. 19, 1984

[51] Int. Cl.⁴ .............................................. H01G 9/00
[52] U.S. Cl. ................................... 361/433; 252/62.2
[58] Field of Search .......................... 361/433; 29/570; 252/62.2

[56] References Cited

U.S. PATENT DOCUMENTS

| | | | |
|---|---|---|---|
| 2,793,275 | 3/1956 | Houtz et al. | 317/230 |
| 3,454,840 | 7/1969 | Hagihara et al. | 317/230 |
| 3,622,843 | 11/1971 | Vermilyea | 252/62.2 X |
| 3,733,291 | 5/1973 | Alwitt | 204/29 |
| 4,428,028 | 1/1984 | Ross et al. | 361/433 |
| 4,476,517 | 10/1984 | Fresia | 361/433 X |

FOREIGN PATENT DOCUMENTS 984737 3/1965 United Kingdom .
1531208 11/1978 United Kingdom .

Primary Examiner—L. T. Hix
Assistant Examiner—Douglas S. Lee

[57] ABSTRACT

In an aluminum foil electrolytic capacitor, the anode foil bears both a layer of hydrous aluminum oxide and a layer of barrier dielectric oxide and is in contact with an electrolyte containing as additives up to 5 wt % depolarizer and sufficient soluble phosphate salt to restore the desired anodization voltage.

3 Claims, 2 Drawing Figures

ALUMINUM ELECTROLYTIC CAPACITOR

BACKGROUND OF THE INVENTION

This invention concerns an aluminum foil electrolytic capacitor in which the anode foil bears both a layer of hydrous aluminum oxide and a barrier layer dielectric oxide and is in contact with an electrolyte containing up to 5 wt% depolarizer and sufficient soluble phosphate to restore the maximum anodization voltage to the desired level.

The role of added phosphate ion in the working electrolytes for aluminum electrolytic capacitors is not fully understood. It is known that phosphate ion effectively inhibits the hydration of aluminum. This is the basis for adding small amounts of phosphate ion, usually as ammonium dihydrogen phosphate, to working electrolytes. This helps to insure the continued passivation of the cathode foil and to protect it against hydration. The hydration reaction is accompanied by copious hydrogen gas evolution, and the effect of this gas evolution is a frequent cause of capacitor failure.

In order to take care of this gas evolution, it would be desirable to add an effective depolarizer to react with the hydrogen as it is generated and thus prevent its buildup and capacitor failure.

However, electrolytic capacitor problems increase in severity as the working voltage of the capacitor increases and as the physical size of the capacitor decreases. With higher capacitance and higher working voltages, there is an increasing probability of encountering defect and impurity sites in the anodic oxide which leads to higher leakage currents, which in turn means more evolution of hydrogen gas at the cathode. This gassing frequently leads to first the bulging of the capacitor case and eventually to the disruption of the assembly and failure of the capacitor.

When the amount of depolarizer added to the electrolyte is increased to up to 5% to counteract the additional hydrogen evolution noted above, particularly in high voltage capacitors (200 V and higher), the higher concentration unfortunately decreases the voltage capabilities of the electrolyte to the point where the electrolyte is no longer suitable for such high voltage operation.

Not only has the severity of service requirements for electrolytic capacitors been increasing with regard to higher working voltages, higher capacitances, and smaller physical sizes, but also the temperature requirements have increased. Today, capacitors are designed to operate at 125° C. and even 150° C. rather than the usual 65° C. or 85° C. of the past. At these higher temperatures, the prior levels of phosphate ion concentration are proving to be inadequate. Thus, it would be desirable to increase the phosphate concentration particularly since there is growing evidence indicating its presence also helps to stabilize the oxide layer on the anode. This stabilization is shown by lower leakage currents, but the mechanism by which this is achieved is not understood.

Thus, it is desirable to increase the concentrations of both the depolarizer and the phosphate in electrolytes intended for high voltage service (200 V or higher) without sacrificing the voltage capabilities of these electrolytes. It is to this end that the present invention is addressed.

SUMMARY OF THE INVENTION

It is a feature of the present invention to increase the concentrations of the phosphate and the depolarizer additives in electrolytes up to 5% without sacrificing high voltage capabilities. It has been found that it is possible to do this providing the anode foil used in the capacitor bears a layer of hydrous oxide in addition to the barrier layer dielectric oxide.

There are two basic formation processes used to manufacture anode foil for electrolytic capacitors. The first uses ammonium dihydrogen phosphate and/or diammonium adipate as the solute in the formation electrolyte. This results in an anode foil which has no coating of hydrous aluminum oxide. The results given below with "plain foil" are analogous to the response of a working electrolyte to this type of foil which receives no preboil and has no hydrous oxide layer. This type of foil is used for low-voltage, e.g., 0 to 100 V, capacitors.

In the second formation process, the foil is first treated with boiling water in a boil tower to coat the foil with hydrous oxide, followed by anodization in a boric acid solution. The complex process involves additional boil tower treatments to effect stabilization or "depolarization" followed by reformation to finally give a stable high voltage film for capacitors rated above 100 V and generally above 200 V.

This cumbersome process has the advantage of providing energy savings and of permitting anodization to higher voltages. The hydrous oxide does contribute to equivalent series resistance (ESR), and for some applications efforts are made to minimize this hydrous layer or eliminate it entirely. One way to do this is to strip the anodized foil in a mixture of chromic and phosphoric acids and then reform as described by R. S. Alwitt in U.S. Pat. No. 3,733,291, issued May 15, 1973.

A coherent hydrous oxide layer, even if this entails a slightly higher ESR, is retained in the present invention, and the results with "boiled foil" given below are analogous to the response of a working electrolyte to this type of foil in high-voltage capacitors.

DESCRIPTION OF THE PREFERRED EMBODIMENTS

Figure 1:
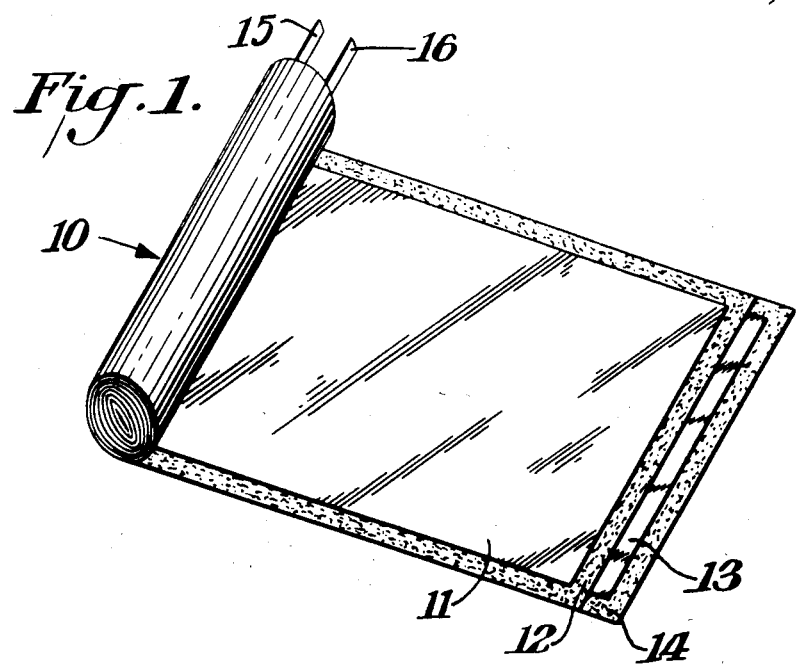
FIG. 1 is a view of a capacitor section partially unrolled.

An electrolytic capacitor section 10 has an anodized aluminum foil anode 11 which also bears a layer of hydrous oxide and an aluminum foil cathode 13, which may bear a dielectric oxide layer, wound with interleaved spacer material 12, 14. Electrode tab 15 is attached to anode foil 11 and tab 16 to cathode foil 13. Tabs 15 and 16 extend from the same side of the section as shown in FIG. 1 or opposite sides as shown in FIG. 2.

Figure 2:
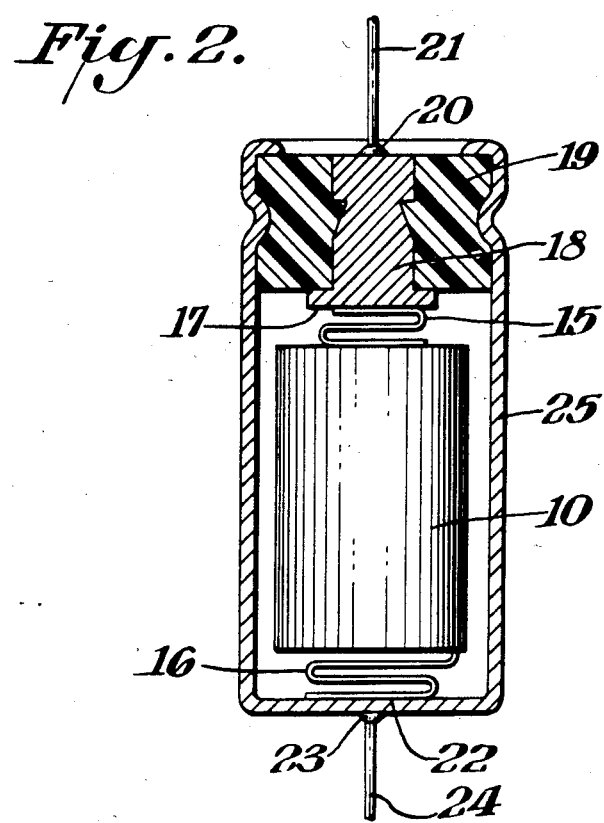
FIG. 2 is a cross-section of a finished capacitor.

In FIG. 2, section 10 is located in housing 25, preferably an aluminum can, and cathode tab 16 is connected, preferably by a weld, at 22 to the interior of the bottom of can 25. Anode tab 15 is connected to the bottom 17 of metal terminal insert 18, preferably by a weld. Insert 18 passes through a plastic or elastomeric insulating gasket or bung 19, and external anode lead 21 is affixed to the exterior upper surface of insert 18 via weld 20. Similarly, external cathode lead 24 is affixed to the exterior bottom surface of can 25 via weld 23. Capacitor section 10 is impregnated with electrolyte.

The electrolyte may be any high-voltage electolyte, e.g., a glycol-borate, dodecanedioate, adipate, etc., to which is added up to 5% of a depolarizer and sufficient phosphate to restore the voltage capabilities of the electrolyte, generally up to 5%. In addition, the anode foil of the capacitor must bear a layer of hydrous oxide in addition to the barrier layer anodic oxide. The need for these three materials to be present will be shown in the following examples.

EXAMPLE 1

In this example, a depolarizer is added to a high voltage electrolyte consisting of 26.5% triethylammonium dodecanedioate, 35.2% ethylene glycol, 32.5% N-methylpyrrolidinone, and 5% water. The depolarizer is p-nitrophenol, and the resistivity of the electrolyte is measured in ohm-cm at 25° C. and the maximum anodization voltage (V max) on plain foil (no hydrous oxide present) at 85° C. is measured in volts.

TABLE 1

| Amt. of depolarizer | Resistivity | V max |
| --- | --- | --- |
| 0% | 738 | 430 |
| 0.5% | 737 | 415 |
| 1.0% | 751 | 340 |
| 5.0% | 778 | 200 |

While it is desirable for extended capacitor life to add 3 to 5% depolarizer, it is obvious from the data above that such amounts would adversely affect the voltage capability of the electrolyte.

As the following example will show, this capability can be restored if a phosphate is added to the electrolyte and if there is hydrous oxide present on the anode foil.

EXAMPLE 2

In this example, "boiled foil" is used as representative of commercial foil made by preboiling the foil in boil towers as described earlier. This "boiled foil" used experimentally is made by treating aluminum foil with boiling distilled water for two minutes prior to anodization to coat the foil with a layer of hydrous oxide.

In Table 2, all electrolytes contain triethylammonium dodecanedioate as salt, an ethylene glycol and N-methylpyrrolidone solvent mixture, water, and p-nitrobenzoic acid (pNBA) as depolarizer; the phosphates are ammonium dihydrogen phosphate (ADP), triethylammonium dihydrogen phosphate (TEP) and tri-n-propylammonium dihydrogen phosphate (TPP). The amounts of each are given in percent, resistivity at 25° C. in ohm-cm ($\Omega$-cm) and Vmax at 85° C. on boiled foil.

TABLE 2

| Salt | Glycol | NMP | Water | TEP | TPP | ADP | pNBA | $\Omega$cm | V max |
| --- | --- | --- | --- | --- | --- | --- | --- | --- | --- |
| 13.1 | 42.8 | 40.1 | 4.0 | | | | | 962 | 448 |
| 12.6 | 41.7 | 38.5 | 4.0 | | | | 3.2 | 914 | 235 |
| 12.6 | 41.3 | 38.7 | 4.2 | | | 0.2 | 3.1 | 910 | 300 |
| 12.6 | 41.2 | 38.6 | 4.0 | 0.5 | | | 3.1 | 919 | 300 |
| 12.4 | 40.8 | 38.2 | 4.0 | 1.5 | | | 3.1 | 912 | 405 |
| 12.3 | 40.7 | 37.6 | 3.9 | 2.5 | | | 3.1 | 907 | 415 |
| 12.2 | 40.3 | 37.2 | 3.0 | 3.4 | | | 3.1 | 905 | 418 |
| 12.0 | 39.4 | 37.0 | 3.8 | 4.8 | | | 3.0 | 901 | 413 |
| 12.5 | 41.3 | 38.1 | 4.0 | | 1.0 | | 3.1 | 937 | 325 |
| 12.3 | 40.5 | 37.4 | 3.9 | | 2.9 | | 3.1 | 983 | 425 |
| 12.0 | 39.4 | 37.0 | 3.8 | | 4.8 | | 3.0 | 1026 | 425 |

From these data, it can be seen that the addition of 3.2% of the depolarizer drops the voltage capability from 448 V to 235 V. While the addition of 0.2% ADP improves the situation slightly, this is close to the solubility limit of ADP. The use of more soluble phosphates overcomes the effect of the depolarizer so that by adding 3.5% phosphate when 3 to 3.2% depolarizer is present, almost full voltage capability is restored.

EXAMPLE 3

In this example, the response of adding a depolarizer and/or a phosphate to three different electrolytes is given. Resistivity at 25° C. is given in ohm-cm, and maximum anodization voltage (V max) at 85° C. is given for both plain and boiled foils. For the fourth electrolyte, only the effect of depolarizer alone and with phosphate is given.

The base electrolytes are, in percent by weight, A—32.5% di-n-propylammonium adipate, 65.1% glycol, 2.4% water; B—13.84% tri-n-propylammonium adipate, 37.21% glycol, 44.18% N-metylpyrrolidinone (NMP), 4.77% water; C—13.1% triethylammonium dodecanodioate, 42.8% glycol, 40.1% NMP, 4.0% water; and D—14.8% triethylammonium dodecanedioate, 81.5% N,N-dimethylformamide, 3.7% water.

TABLE 3

| Electrolyte | $\Omega$-cm | V max Plain | V max Boiled |
| --- | --- | --- | --- |
| A | 791 | 440 | 420 |
| A + 0.5% ADP | 816 | 230 | 415 |
| A + 1% pNBA | 803 | 364 | 333 |
| A + 1% pNBA + 0.5% ADP | 823 | 233 | 400 |
| B | 1072 | 450 | 440 |
| B + 0.48% ADP | 1021 | 210 | 468 |
| B + 1% pNBA | 1044 | 268 | 265 |
| B + 1% pNBA + 0.48% ADP | 1001 | 210 | 450 |
| C | 958 | 470 | 455 |
| C + 2.38% TEP | 935 | 190 | 440 |
| C + 3% pNBA | 914 | 255 | 230 |
| C + 4% pNBA + 2.38% TEP | 912 | 185 | 420 |
| D | 1163 | 483 | 495 |
| D + 3% pNBA | 781 | 205 | 243 |
| D + 3% pNBA + 3% TEP | 772 | 168 | 355 |

These four electrolytes contain three different solutes and three different solvent systems. The results are consistent regardless. In all cases, the phosphate alone drastically reduced voltage capability on plain but not boiled foil, the depolarizer alone reduced it on both foils, but the combination of the two restored the voltage capability almost to the original value on boiled foil but not on plain foil.

Thus, a depolarizer can be added to a high voltage electrolyte at a 3 to 5% level without seriously affecting its voltage capability providing a sufficient amount of soluble phosphate is present and the anode foil bears a hydrous oxide layer on its surface.

While the depolarizers in the examples have been p-nitrobenzoic acid, other depolarizers, preferably ionizable, may be used. Examples of such are ortho- or meta-nitro-benzoic acid, ortho-, meta- or para-nitrophenol, 2,4-di-nitrobenzoic acid, 2,4-dinitrophenol, etc. More than 5% of the depolarizer may be used with an increase in phosphate concentration, but it is preferred to use at most 5% as, even with the phosphate, the depolarizer does depress voltage capabilities somewhat.

What is claimed is:

1. A high voltage aluminum electrolytic capacitor comprising a wound section having two electrode foils with interleaved spacer material, one of said foils bearing a layer of hydrous aluminum oxide and a layer of barrier-layer dielectric oxide on its surface, said foils being in contact with an electrolyte containing as additives 3 to 5 wt% of an ionizable nitro compound as a depolarizer and 1 to 5% of soluble dihydrogen phosphate salt to restore a desired maximum anodization voltage to the electrolyte, said phosphate salt being more soluble than ammonium dihydrogen phosphate.

2. A capacitor according to claim 1 wherein said nitro compound is ortho-, meta-, or para-nitrobenzoic acid, ortho-, meta-, or para-nitrophenol, 2,4-dinitrobenzoic acid, or 2,4-dinitrophenol.

3. A capacitor according to claim 1 wherein said dihydrogen phosphate is triethylammonium or tri-n-propylammonium dihydrogen phosphate.

* * * * *